March 10, 1959 — W. P. MURPHY, JR — 2,876,496

PROCESS FOR MAKING TUBES

Filed Dec. 16, 1955

INVENTOR
WILLIAM P. MURPHY, JR.

BY Cushman, Darby & Cushman
ATTORNEYS

United States Patent Office 2,876,496
Patented Mar. 10, 1959

2,876,496

PROCESS FOR MAKING TUBES

William P. Murphy, Jr., Miami, Fla., assignor to Dade Reagents, Inc., Miami, Fla., a corporation of Florida Application December 16, 1955, Serial No. 553,555

10 Claims. (Cl. 18—56)

The present invention relates to a method of forming a closed end on a small diameter plastic tube.

Ordinarily, when plastic tubing of small external diameter, e. g. 0.5 inch or less, is heated on its end, it tends to expand laterally and shrink longitudinally, causing a flared end. This flared end is difficult to form into a closed end for the tubing.

Accordingly, it is a primary object of the present invention to form a closed and rounded end on small diameter tubing.

An additional object is to devise an improved method of forming a closed end on a tube of thermoplastic material having a flared end.

A further object is to devise an improved method of forming a catheter.

The accomplishment of these and other objects of the invention will become evident as the description of the invention proceeds.

It has now been found that if the end of a small diameter thermoplastic tubing is heated to flare the same, as the tube shrinks lengthwise and expands laterally in the presence of heat, it becomes thickened in the flared area. If the flared end, while in heated condition, is passed through a die or collar having approximately the same central cavity diameter as the external diameter of the tubing before flaring, then the flared cuff will be compressed and form a small ring of semi-molten or softened material at the end of the tube and somewhat thicker than the original wall. After the cuff has been reduced to the original outside diameter size of the tube, it is then thrust into a female mold cavity and the softened end is formed into a smooth rounded end to match the shape of the female die. The shape of the end course can take almost any form, depending on the shape of the female die. The shaping process can be enhanced by inserting a mandrel within the lumen of the tube, the mandrel aids in carrying the tubing into the female die, and forces the plastic material into every crevice of the die. Also, air or hydraulic pressure can be applied internally to accomplish this forming of the tip.

The present method is particularly adapted to the formation of urethral catheters which require that the end be smooth and rounded without sharp projections or irregularities. The eye or slot in the formed tip can then be formed in conventional fashion.

The exact diameter of the tubing is not critical, so long as the thickness of the tubing is relatively small. In making catheters, the use of tubing having an external diameter of about 0.157 inch or about French #12 and an internal diameter about 0.125 inch gives good results, although it also is possible to have an external diameter of about 0.100 inch or about French #7 and an internal diameter of about 0.050 inch, or external diameter of 0.250 inch or about French #19 and internal diameter of 0.190 inch. The external diameter of tubing selected will normally vary depending on the end use. Thus, test tubes made according to the present invention will have a larger external diameter than the above-mentioned catheters.

Almost any thermoplastic material can be employed with polyethylene being preferred. Other suitable plastics are cellulose esters and ethers, e. g. cellulose acetate butyrate, ethyl cellulose, vinyl resins, such as vinyl chloride, copolymer of 80% vinyl chloride with 20% vinyl acetate, vinylidene chloride resins, copolymers of vinylidene chloride with 15% acrylonitrile or vinyl chloride, acrylates, such as methyl methacrylate polymer and ethyl acrylate polymer, synthetic linear superpolyamides, such as polymeric hexamethylene adipamide or sebacamide, polymeric epsilon caprolactam, other forms of nylon such as described in U. S. Patents Nos. 2,071,250 and 2,130,948; polyesters, such as polymeric ethylene terephthalate and other polymeric esters as disclosed in Patent No. 2,465,-319, for example.

Referring to the drawings.

Figure 1:
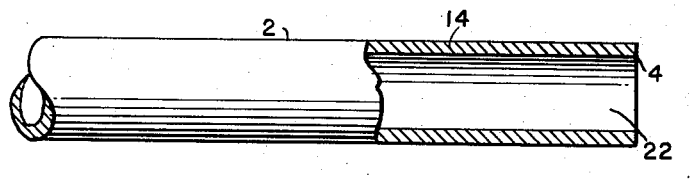
Figure 1 is a vertical elevation partially broken away in section of the plastic tubing.
Figure 2:
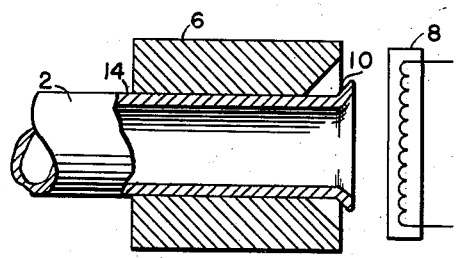
Figure 2 is a vertical elevation partially broken away showing the tube inserted in a collar with the end flared outwardly by heating.
Figure 3:
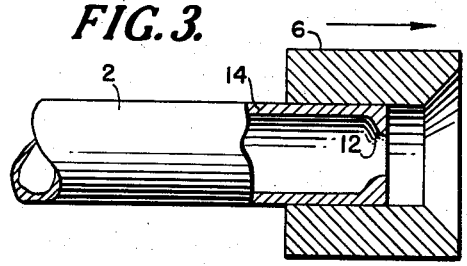
Figure 3 is an elevation similar to Figure 2 after the flared cuff has been reduced in outside diameter.
Figure 4:
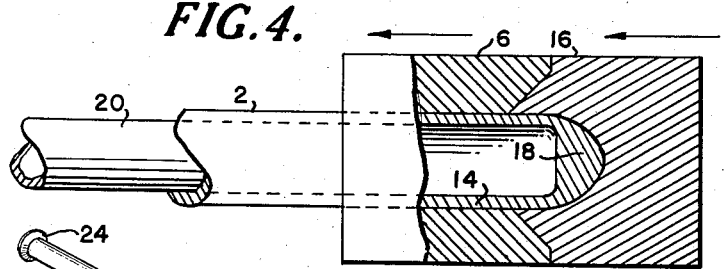
Figure 4 is a vertical elevation partially broken away in section with the end of the tube enclosed in a female mold.

Polyethylene tubing 2 of external diameter of about 0.157 inch and internal diameter of about 0.125 inch to form a wall 14 and having an end 4 is passed through the hollow die or collar 6 so that the end 4 protrudes therefrom. Heat from any source, such as electric heater 8, is applied to the end 4 to at least partially melt the same and cause it to flare outwardly to form cuff 10. The source of heat is removed and while the cuff is still in a semi-molten or softened condition, the collar 6 is moved in the direction of the arrow in Figure 3 to partially force the outwardly flared cuff 10 through the collar and to compress the cuff to the original diameter of the tube 2. The small ring of semi-molten or softened polyethylene formed is somewhat thicker than the original tube wall, as is shown at 12 in Figure 3. A female mold 16 is then thrust in the direction indicated by the arrow in Figure 4 around the end of the tube. The mold 16 is shaped at its forward end to mate with the die 6 and the mold forces the die back in the direction indicated by the arrow in Figure 4 so that the latter is in position to receive another tubing. To aid in shaping the end to the final form 18, a mandrel 20 is inserted in the lumen 22 of the tube 2. The mandrel 20 carries the tubing forward in the female mold and insures that the softened polyethylene is forced into every crevice of the mold.

Figure 5:
Figure 5 is a perspective view of a urethral catheter made according to the invention.

Figure 5 shows a catheter, indicated generally at 23, having the forward end 18 formed in the manner just described. The rearward end 24 is shown flared outwardly (e. g. with the aid of heat) so as to form a catheter. The eye 26 can be formed in the catheter in conventional fashion after forming the closed end 18 or, more advantageously, there can be used the following procedure. The tip of the catheter is slipped between two parallel half-rounds, thus preventing deformation. Spring tension is used to press these half-rounds together. There is cut from one half-round a piece so that a portion of the catheter, about ¼ inch long, is exposed. There is then employed an ordinary, very thin razor blade, bent on a radius of ⅜ inch and held in a small jig. This jig is mounted in a bearing whose axis is perpendicular to the longitudinal axis of the catheter. Therefore, as the razor blade is advanced, its curvature moves laterally across the side of the catheter tip. Slight motion of the blade causes a clean cut with no burrs. It takes a fraction of a second to make the cut and the cut is completed.

While the drawings illustrate a preferred form of the invention, numerous variations therein are permissible without altering the spirit of the invention. Thus, instead of passing the tube 2 through the collar 6, it is possible to employ a split collar which can be positioned around the tube either before or after the heating. The heating can be accomplished by the use of a gas flame, radiant heat, etc. The flared end of the tube can be compressed by moving the tube rearwardly through the collar rather than by moving the collar. Similarly, the tube can be thrust into the female mold cavity which remains stationary rather than employing a movable mold. Still other variants will be evident to those skilled in the art.

I claim:

1. The method of making a closed end on a plastic tube of relatively small diameter and having a flared end comprising forcing the flared end of said tube while in heated, softened condition at least partially through a die having an internal diameter substantially the same as the external diameter of said tube to compress said flared end so as to form a thickened wall portion and then shaping and forming said compressed and thickened flared end into a closed end.

2. The method of making a closed end on a plastic tube of relatively small diameter comprising heating one end of said tube to form a flared end, forcing the heated flared end of said tube in softened condition through a die having an internal diameter substantially the same as the external diameter of said tube to compress said flared end so as to form a thickened wall portion and then shaping and forming said compressed and thickened flared end into a closed end.

3. The method of making a closed end on a thermoplastic tube of relatively small diameter comprising positioning one end of said tube external of a die of substantially the same internal diameter as the external diameter of said tube and through which said tube extends, heating said one end to form a flared end, moving one of said flared end and said die while said flared end is in heated, softened condition to force said flared end at least partially through said die and to compress said flared end so as to form a thickened wall portion and then shaping and forming said compressed and thickened flared end into a closed end.

4. A method according to claim 3 wherein the shaping of the end of the tube is aided by the injection of a mandrel through the lumen of the tube.

5. A method according to claim 3 wherein the plastic tube is made of polyethylene.

6. A method according to claim 3 wherein the plastic tube is made of a vinyl resin.

7. A method according to claim 3 wherein the plastic tube is made of a cellulose ester.

8. A method according to claim 7 wherein the cellulose ester is cellulose acetate butyrate.

9. The method of making a closed end on a thermoplastic tube of relatively small diameter comprising passing one end of said tube through an open elongated collar of substantially the same internal diameter as the external diameter of said tube, heating said one end to form a flared end, moving said collar in an axial direction while said flared end is in a heated, softened condition to force said flared end partially through said collar and to compress said flared end so as to form a thickened wall portion, then moving said collar axially in the reverse direction away from said compressed flared end and positioning a female mold around said compressed and thickened flared end, shaping and forming the same into a closed end and removing said tube from said mold and said collar.

10. A method according to claim 9 wherein the shaping of the end of the tube is aided by the injection of a mandrel through the lumen of the tube.

References Cited in the file of this patent

UNITED STATES PATENTS

| | | |
|---|---|---|
| 950,381 | Dutcher | Feb. 22, 1910 |
| 1,948,605 | Whitehouse | Feb. 27, 1934 |
| 2,270,162 | De Margitta | Jan. 13, 1942 |
| 2,313,474 | Hill | Mar. 9, 1943 |
| 2,661,499 | James et al. | Dec. 8, 1953 |